(12) United States Patent
Han et al.

(10) Patent No.: US 10,771,462 B2
(45) Date of Patent: Sep. 8, 2020

(54) USER TERMINAL USING CLOUD SERVICE, INTEGRATED SECURITY MANAGEMENT SERVER FOR USER TERMINAL, AND INTEGRATED SECURITY MANAGEMENT METHOD FOR USER TERMINAL

(71) Applicant: ELECTRONICS AND TELECOMMUNICATIONS RESEARCH INSTITUTE, Daejeon (KR)

(72) Inventors: Seunghun Han, Daejeon (KR); Hyun Ku Kim, Daejeon (KR); Wook Shin, Daejeon (KR); Byung-Joon Kim, Daejeon (KR); Hyoung-Chun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 213 days.

(21) Appl. No.: 15/980,945

(22) Filed: May 16, 2018

(65) Prior Publication Data
US 2019/0166123 A1  May 30, 2019

(30) Foreign Application Priority Data
Nov. 29, 2017  (KR) .................. 10-2017-0161348

(51) Int. Cl.
*H04L 29/06* (2006.01)
*H04L 29/08* (2006.01)

(52) U.S. Cl.
CPC ........ *H04L 63/0876* (2013.01); *H04L 63/102* (2013.01); *H04L 67/02* (2013.01); *H04L 67/10* (2013.01)

(58) Field of Classification Search
CPC ... H04L 63/0876; H04L 63/102; H04L 67/02; H04L 67/10
See application file for complete search history.

(56) References Cited

U.S. PATENT DOCUMENTS

| 9,740,470 B2 | 8/2017 | Shin | |
|---|---|---|---|
| 2012/0185692 A1* | 7/2012 | Hamlin | H04L 63/0876 713/155 |

(Continued)

FOREIGN PATENT DOCUMENTS

| KR | 10-0496980 B1 | 6/2005 |
|---|---|---|
| KR | 10-2011-0021509 A | 3/2011 |

(Continued)

*Primary Examiner* — Yonas A Bayou
(74) *Attorney, Agent, or Firm* — LRK Patent Law Firm (57) ABSTRACT

A user terminal using cloud service, an integrated security management server for the user terminal, and an integrated security management method for the user terminal. The integrated security management method includes receiving, by an integrated security management server, authentication information from at least one user terminal that use a cloud service, authenticating, by the integrated security management server, the user terminal using the authentication information, transmitting, by the integrated security management server, task information to the user terminal so as to control the user terminal, receiving, by the integrated security management server, at least one of a result of processing the task information and state information from the user terminal that verifies the task information, and managing, by the integrated security management server, a state of the user terminal based on at least one of the result of processing and the state information.

20 Claims, 8 Drawing Sheets

(56) References Cited

U.S. PATENT DOCUMENTS

| | | | |
|---|---|---|---|
| 2012/0265976 A1* | 10/2012 | Spiers | G06F 9/45533 |
| | | | 713/2 |
| 2012/0303952 A1* | 11/2012 | Smith | H04L 63/0823 |
| | | | 713/158 |
| 2013/0125204 A1* | 5/2013 | La Fever | H04L 63/0435 |
| | | | 726/2 |
| 2014/0173082 A1* | 6/2014 | Shin | G16H 40/67 |
| | | | 709/223 |
| 2014/0250491 A1* | 9/2014 | Fleischman | G06F 12/1408 |
| | | | 726/1 |
| 2015/0188949 A1* | 7/2015 | Mahaffey | H04W 12/0027 |
| | | | 726/1 |
| 2015/0244704 A1* | 8/2015 | Morrissey | H04L 67/02 |
| | | | 726/8 |
| 2016/0065589 A1* | 3/2016 | Leighton | H04W 4/029 |
| | | | 726/4 |
| 2016/0112413 A1* | 4/2016 | Wang | H04L 63/0846 |
| | | | 713/171 |
| 2016/0301695 A1* | 10/2016 | Trivelpiece | H04L 63/0876 |
| 2017/0359312 A1* | 12/2017 | Chen | H04L 63/0823 |
| 2018/0114015 A1* | 4/2018 | Nuseibeh | H04L 63/107 |

FOREIGN PATENT DOCUMENTS

| | | |
|---|---|---|
| KR | 10-2014-0078518 A | 6/2014 |
| KR | 10-2016-0127878 A | 11/2016 |

* cited by examiner

USER TERMINAL USING CLOUD SERVICE, INTEGRATED SECURITY MANAGEMENT SERVER FOR USER TERMINAL, AND INTEGRATED SECURITY MANAGEMENT METHOD FOR USER TERMINAL

CROSS REFERENCE TO RELATED APPLICATION

This application claims the benefit of Korean Patent Application No. 10-2017-0161348, filed Nov. 29, 2017, which is hereby incorporated by reference in its entirety into this application.

BACKGROUND OF THE INVENTION

1. Technical Field

The present invention relates generally to integrated security management technology for a user terminal that uses a cloud service, and more particularly, to technology for managing and controlling operation- and security-related functions of a user terminal that uses a cloud service in an integrated manner.

2. Description of Related Art

Cloud computing technology is technology that enables information and communications technology (ICT) resources, such as servers, storage, and software, to be used in the form of a service over the Internet. Unlike a scheme in which a user personally possesses and manages resources, cloud computing allows respective users to be provided with required resources in a virtualized form over the Internet.

In a cloud computing environment, tasks are processed through a browser using web-based software stored in a server without directly installing software on a user terminal. Accordingly, confidential user information is shifted from the terminal to the server that provides service.

Further, in a cloud environment, a plurality of users share resources provided by the server. Because of this, when malware or malicious code intrudes into the corresponding terminal due to vulnerability-causing terminal settings or the absence of security functions, damage resulting from the intrusion may also propagate to the server. When malware propagates to the server, a large amount of confidential user information may be leaked, and great damage incomparable to that of a conventional terminal software installation environment is caused.

Further, a conventional terminal management system collects only the state information of the Operating Systems (OSs) of terminals or aggregates only simple information with the OS state information by running security software (e.g. antivirus software, media control software, or the like) operated separately from the terminal management system on the terminals. Since the conventional terminal management system is operated as a system separate from a security function individually installed on each terminal, it is difficult to check in detail the state of the security function or control the security function through a terminal management server.

In a cloud environment, the security of a terminal is directly related to the security of confidential information stored in a cloud. Therefore, there is required the development of an integrated terminal security management system that can strengthen the security of a terminal by overcoming the limitations of interoperation with security technology in conventional management systems. In connection with this, Korean Patent Application Publication No. 10-2014-0078518 (Published on Jun. 25, 2014) discloses a technology related to "Method for Managing of External Devices, Method for Operating of External Device, Host Device, Management Server, and External Device."

SUMMARY OF THE INVENTION

Accordingly, the present invention has been made keeping in mind the above problems occurring in the prior art, and an object of the present invention is to manage operation information and security state information of a user terminal that uses a cloud service in an integrated manner by overcoming the limitations of interaction with security technology in a conventional terminal management system.

Another object of the present invention is to control security setting and operation setting of a user terminal that uses a cloud service and to securely manage the user terminal through a central integrated security management server.

A further object of the present invention is to control the operating system-level resources and browser level-resources of a user terminal using an integrated security management server.

In accordance with an aspect of the present invention to accomplish the above objects, there is provided an integrated security management method for a user terminal, including receiving, by an integrated security management server, authentication information from at least one user terminal that use a cloud service, authenticating, by the integrated security management server, the user terminal using the received authentication information, transmitting, by the integrated security management server, task information to the user terminal so as to control the user terminal, receiving, by the integrated security management server, at least one of a result of processing the task information and state information from the user terminal that verifies the task information, and managing, by the integrated security management server, a state of the user terminal based on at least one of the result of processing and the state information.

Transmitting the task information to the user terminal may include transmitting the task information and verification information related to the task information to the user terminal, and allowing the user terminal to verify the task information using the verification information.

The task information may include at least one of resource control setting information, security setting information, configuration information, software configuration change information, software function control information, and resource control information, and the verification information may include at least one of a hash value and signature information for the task information.

The security setting information may include at least one of a user password change period, a screensaver running period, information on authority to permit addition and installation of software for respective users, and information on authority to permit deletion of software for respective users, and the configuration information may include at least one of software storage address information, address information of respective domains, and information on time synchronization with the integrated security management server.

The resource control setting information may control the user terminal such that the user terminal performs at least one of control of access to operating system resources and control of access to browser resources.

The resource control setting information may include at least one of resource access control information that allows the user terminal to control access to the operating system resources for respective users and browser control information that allows the user terminal to control access to the browser resources for respective cloud services.

The resource access control information may control access to the operating system resources including at least one of a network, a storage medium, a clipboard, a camera and an input/output device that correspond to the user terminal.

The browser control information may control access to the browser resources including at least one of a storage medium, a Global Positioning System (GPS) device, a clipboard, a camera, a plug-in, and an application that correspond to the user terminal.

Receiving the authentication information may include receiving the authentication information including at least one of terminal authentication information and user authentication information for the user of the user terminal.

In accordance with another aspect of the present invention to accomplish the above objects, there is provided an integrated security management server for a user terminal, including a communication unit for receiving authentication information from at least one user terminal that use a cloud service, a terminal and user authentication unit for authenticating the user terminal using the authentication information, a task information management unit for managing task information to be transmitted to the user terminal so as to control the user terminal, and a terminal state management unit for managing at least one of a result of processing the task information and state information received from the user terminal that processes the task information.

The communication unit may transmit the task information and verification information including at least one of a hash value and signature information for the task information to the user terminal, and may receive at least one of the result of processing the task information and the state information from the user terminal that verifies the task information.

The task information management unit may manage the task information including at least one of resource control setting information, security setting information, configuration information, software configuration change information, software function control information, and resource control information.

The resource control setting information may include at least one of resource access control information that allows the user terminal to control access to operating system resources for respective users and browser control information that allows the user terminal to control access to browser resources for respective cloud services.

The terminal and user authentication unit may be configured to, before transmitting the task information to the user terminal, authenticate the user terminal based on terminal authentication information received from the user terminal, and authenticate a user of the cloud service based on user authentication information.

In accordance with a further aspect of the present invention to accomplish the above objects, there is provided a user terminal for providing a cloud service to a user, including a terminal communication unit for transmitting authentication information to an integrated security management server, and receiving task information from the integrated security management server that performs authentication based on the authentication information, a task information verification unit for verifying the task information based on verification information received from the integrated security management server, a state management unit for managing at least one of a security state and an operating state of a user terminal, an integrity verification unit for verifying integrity of at least one of software, a file, and a kernel area in accordance with the task information that has been verified, a resource access control unit for controlling authority to access resources in accordance with the task information that has been verified, and an update control unit for changing configuration of previously installed software in accordance with the task information that has been verified.

The terminal communication unit may receive the task information that includes at least one of resource control setting information, security setting information, configuration information, software configuration change information, software function control information, and resource control information, and the verification information that includes at least one of a hash value and signature information for the task information.

The security setting information may include at least one of a user password change period, a screensaver running period, information on authority to permit addition and installation of software for respective users, and information on authority to permit deletion of software for respective users.

The resource access control unit may include a resource access control module for controlling access to operating system resources for respective users based on the task information, and a browser control module for controlling access to browser resources for respective cloud services based on the task information.

The state management unit may periodically check a security state of the user terminal and checks the security state when a security threat is determined to occur.

The configuration information may include at least one of software storage address information, address information of respective domains, and information on time synchronization with the integrated security management server.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

Figure 1:
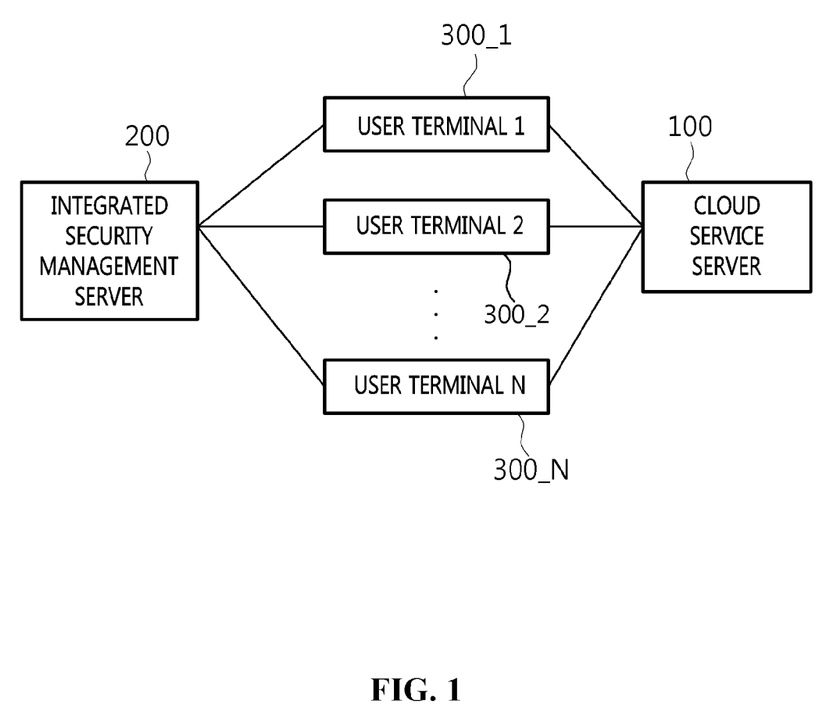
FIG. 1 is a diagram schematically illustrating an environment to which an integrated security management server for a user terminal that uses a cloud service is applied according to an embodiment of the present invention.

FIG. 1 is a diagram schematically illustrating an environment to which an integrated security management server for a user terminal that uses a cloud service is applied according to an embodiment of the present invention.

As illustrated in FIG. 1, an integrated security management system for a user terminal that uses a cloud service includes at least one cloud service server 100, an integrated security management server 200 for a user terminal (hereinafter also referred to as an "integrated security management server 200"), and one or more user terminals 300.

The user terminals 300 may include various types of terminals. Further, the user terminals 300 are connected to the cloud service server 100 to receive data from the cloud service server 100 and to provide a cloud service to users.

The integrated security management server 200 may be connected to one or more user terminals 300 that use the service provided by the cloud service server 100. Further, the integrated security management server 200 may transmit task information to the user terminals 300, thus allowing the user terminals 300 to verify integrity in accordance with the task information, control authority to access resources, or change the configuration of software.

Also, the integrated security management server 200 may receive the results of processing the task information or the security states and operating states of the user terminals 300 from the user terminals 300, and thus manage the security functions of the user terminals 300 in an integrated manner.

Hereinafter, the configurations of an integrated security management server and a user terminal according to an embodiment of the present invention will be described in detail with reference to FIGS. 2 and 3.

Figure 2:
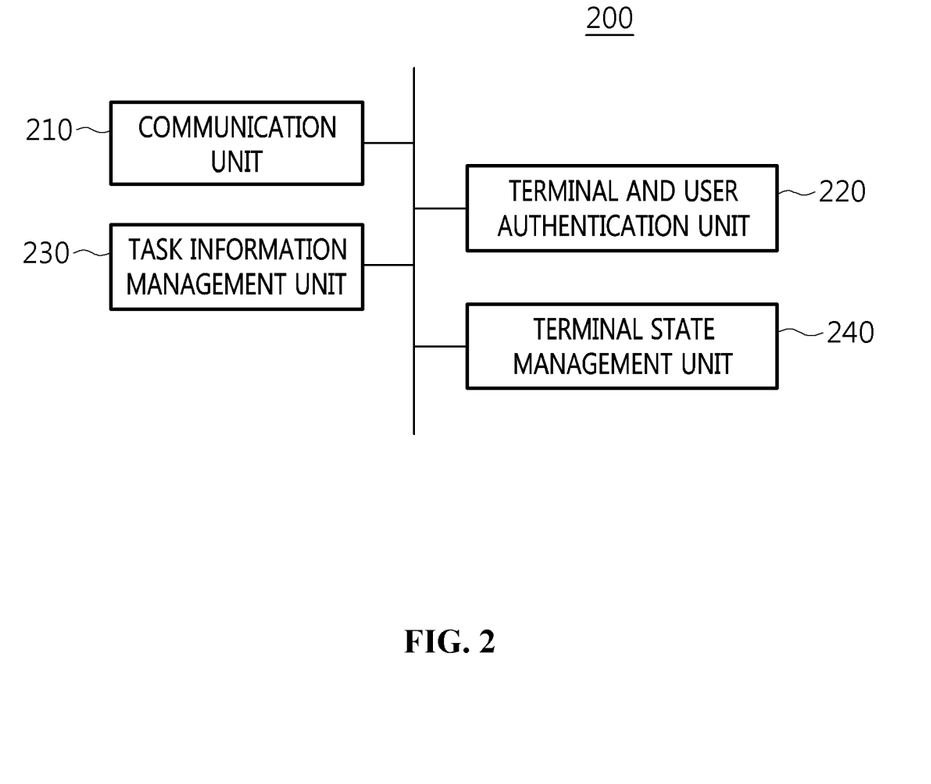
FIG. 2 is a block diagram illustrating the configuration of an integrated security management server for a user terminal according to an embodiment of the present invention.

FIG. 2 is a block diagram illustrating the configuration of an integrated security management server for user terminals according to an embodiment of the present invention.

As illustrated in FIG. 2, the integrated security management server 200 includes a communication unit 210, a terminal and user authentication unit 220, a task information management unit 230, and a terminal state management unit 240.

First, the communication unit 210 receives authentication information from one or more user terminals 300 that use a cloud service. The communication unit 210 may receive authentication information including at least one of terminal authentication information and user authentication information from the user terminals 300.

Further, the communication unit 210 transmits task information and verification information, including at least one of a hash value and signature information for the task information, to the corresponding user terminal 300, and may receive at least one of the result of processing the task information and state information from the user terminal 300, which verifies the task information.

The communication unit 210 receives at least one of the result of processing the task information and state information from each user terminal 300, which has completed the verification of the task information, wherein the state information received from the user terminal 300 may include at least one of security state information and operating state information.

The terminal and user authentication unit 220 authenticates each user terminal 300 using the authentication information.

The terminal and user authentication unit 220 may authenticate the user terminal 300 based on the terminal authentication information received from the user terminal 300 before transmitting task information to the user terminal 300. Further, the terminal and user authentication unit 220 performs user authentication for a cloud service based on the user authentication information.

Next, the task information management unit 230 manages task information to be transmitted to the user terminal 300.

The task information management unit 230 may manage task information including at least one of resource control setting information, security setting information, environment setting (configuration) information, software configuration change information, software function control information, and resource control information.

Here, the resource control setting information may include at least one of resource access control information and browser control information. The resource access control information is resource control setting information that allows the user terminal 300 to control access to operating system resources for respective users, and the browser control information is resource control setting information that allows the user terminal 300 to control access to browser resources for respective cloud services.

Finally, the terminal state management unit 240 may manage, for each user terminal, at least one of the result of processing the task information and the state information, which are received from the user terminal 300 having processed the task information.

Figure 3:
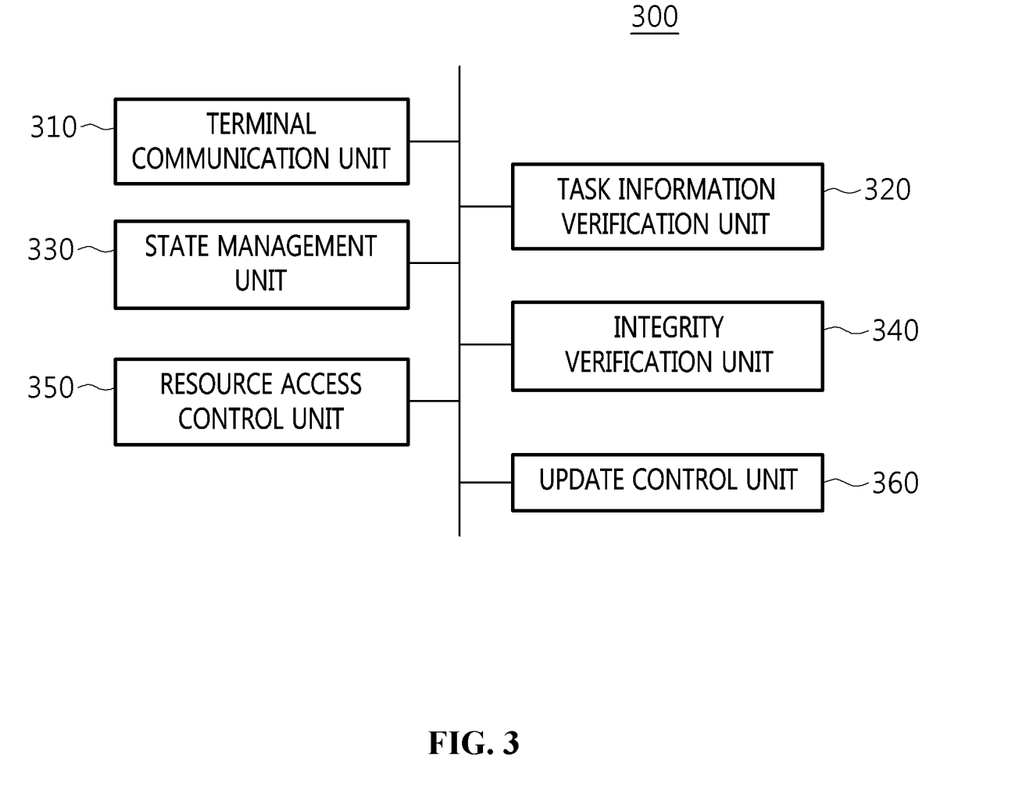
FIG. 3 is a block diagram illustrating the configuration of a user terminal that uses a cloud service according to an embodiment of the present invention.

FIG. 3 is a block diagram illustrating the configuration of a user terminal that uses a cloud service according to an embodiment of the present invention.

As illustrated in FIG. 3, the user terminal 300 for providing a cloud service from the cloud service server 100 to a user includes a terminal communication unit 310, a task information verification unit 320, a state management unit 330, an integrity verification unit 340, a resource access control unit 350, and an update control unit 360.

First, the terminal communication unit 310 allows the integrated security management server 200 to authenticate the user terminal 300 by transmitting authentication information to the integrated security management server 200.

Further, the terminal communication unit 310 receives task information from the integrated security management server 200 which authenticates the user terminal 300. The terminal communication unit 310 may receive the task information including at least one of setting information and control information, and may also receive verification information related to the task information, together with the task information.

Here, the setting information may include at least one of resource control setting information, security setting information, and configuration information. The control information may include at least one of software configuration change information, software function control information, and resource control information. Further, the verification information related to the task information may include at least one of a hash value for the task information and signature information for the task information.

In addition, the terminal communication unit 310 may transmit at least one of the result of processing the task information and the state information of the user terminal 300 to the integrated security management server 200.

In particular, the terminal communication unit 310 may transmit at least one of security state information and operating state information generated by the state management unit 330 to the integrated security management server 200, and may allow the integrated security management server 200 to manage or control the operation- and security-related functions of the user terminal 300 in an integrated manner.

Next, the task information verification unit 320 verifies the task information based on the verification information received from the integrated security management server 200.

Here, the task information verification unit 320 may verify the task information by determining whether a hash value or signature information for the verification information, received through the terminal communication unit 310, is identical to the hash value or signature information for the task information.

The state management unit 330 may manage at least one of the security state and operating state of the user terminal 300, and may generate and store security state information and operating state information. When at least one of the integrity verification unit 340, the resource access control unit 350, and the update control unit 360 performs processing corresponding to the task information, the state management unit 330 may generate security state information and operating state information corresponding to the processing.

Also, the state management unit 330 may check the security state of the user terminal 300 either periodically or when a security threat is determined to occur, and may then generate security state information.

Next, the integrity verification unit 340 may verify the integrity of at least one of software, a file, and a kernel area in accordance with the task information received from the integrated security management server 200.

The resource access control unit 350 controls authority to access resources in accordance with the received task information. Also, the resource access control unit 350 may include a resource access control module for controlling access to operating system resources for respective users based on the task information and a browser control module for controlling access to browser resources for respective cloud services based on the task information.

Finally, the update control unit 360 may change the configuration of software previously installed on the user terminal 300 in accordance with the task information.

Here, the integrity verification unit 340, the resource access control unit 350, and the update control unit 360 may verify the integrity of the task information after the task information has been verified by the task information verification unit 320.

Hereinafter, an integrated security management method performed by the integrated security management server for a user terminal according to an embodiment of the present invention will be described in detail.

Figure 4:
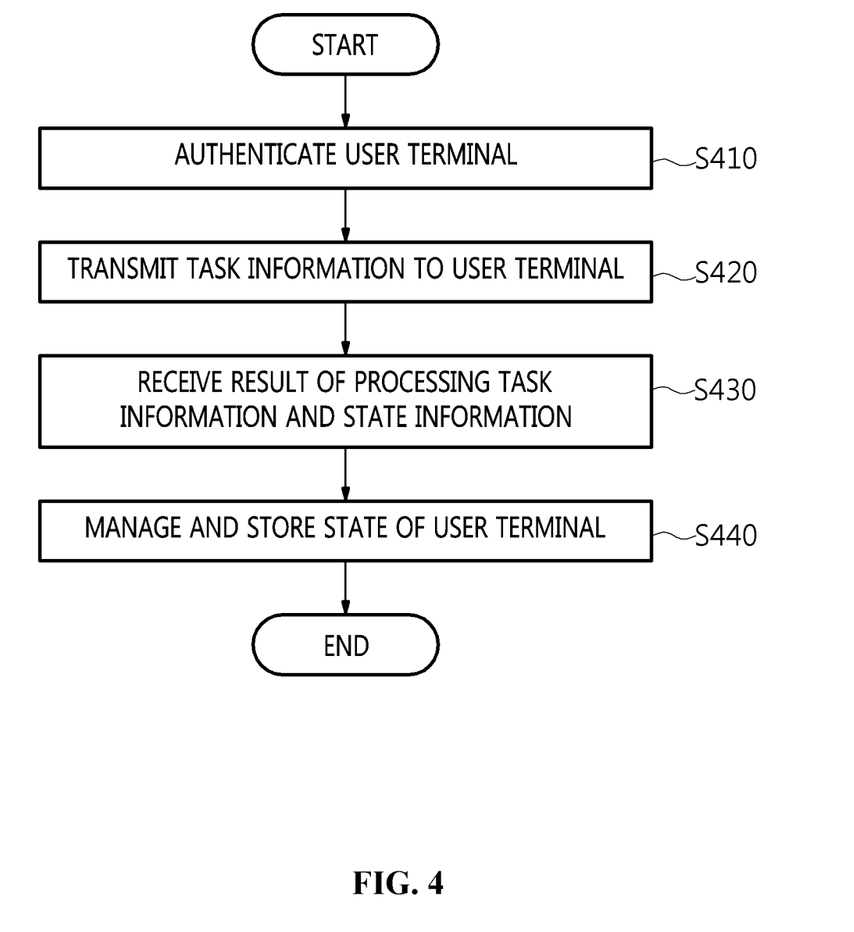
FIG. 4 is a flowchart for explaining an integrated security management method for a user terminal according to an embodiment of the present invention.

FIG. 4 is a flowchart for explaining an integrated security management method for a user terminal (hereinafter also referred to as an "integrated security management method") according to an embodiment of the present invention.

First, the integrated security management server 200 authenticates one or more user terminals 300 at step S410.

The integrated security management server 200 receives terminal authentication information including the identifier and additional information of the corresponding user terminal 300 from each of the user terminals 300. Further, the integrated security management server 200 may authenticate the corresponding user terminal 300 using the received terminal authentication information.

The identifier of the user terminal 300 included in the terminal authentication information may include at least one of a terminal ID entered by a user, information extracted using the hardware information of the user terminal 300, Media Access Control (MAC) information of a network card, and the password of the user terminal 300.

Further, the additional information included in the terminal authentication information may include at least one of the name of the corresponding user terminal 300, domain information, the location information of the user terminal 300, and the owner information of the user terminal 300.

In this way, the integrated security management server 200 may authenticate the user terminal 300, and may then manage the user terminal 300 capable of communicating with the integrated security management server 200.

Further, the integrated security management server 200 may authenticate the users of one or more user terminals 300 by receiving the user authentication information of the users of the user terminals 300. Here, each piece of user authentication information may include a user identifier and a user password.

Furthermore, the integrated security management server 200 may perform authentication by receiving at least one of the terminal authentication information and the user authentication information, issue a certificate to each user terminal 300, and perform a mutual authentication procedure.

Next, the integrated security management server 200 transmits task information to a user terminal 300 that has been authenticated at step S420.

The integrated security management server 200 transmits task information for controlling the user terminal 300 and verification information related to the task information to the corresponding user terminal 300. The task information may include at least one of resource control setting information, security setting information, configuration information, software configuration change information, software function control information, and resource control information.

Here, the verification information may be a hash value or signature information for the task information, and the user terminal 300, having received the task information and the verification information, may verify the task information using the verification information.

The integrated security management server 200 according to the embodiment of the present invention may control the operation function and security function of the user terminal 300 by transmitting the task information to the corresponding user terminal 300, and may manage, for each user terminal 300, the operating state and security state of the user terminal 300 in an integrated manner by receiving the result of processing the task information, the state information, etc. from the user terminal 300.

Next, the integrated security management server 200 receives the result of processing the task information and the state information at step S430.

The integrated security management server 200 may receive the result of processing the task information and the state information from the user terminal 300 which verifies the task information received at step S420.

Finally, the integrated security management server 200 manages and stores the state of the user terminal 300 at step S440.

The integrated security management server 200 may manage and process the security state and operating state of the user terminal 300 based on the result of processing the task information and the state information received at step S430. Also, the integrated security management server 200 may perform the integrated security management process of FIG. 4 in conjunction with a plurality of user terminals, and may manage the security states and operating states of respective user terminals in an integrated manner.

Hereinafter, an integrated security management method performed by a user terminal that uses a cloud service according to an embodiment of the present invention will be described in detail.

Figure 5:
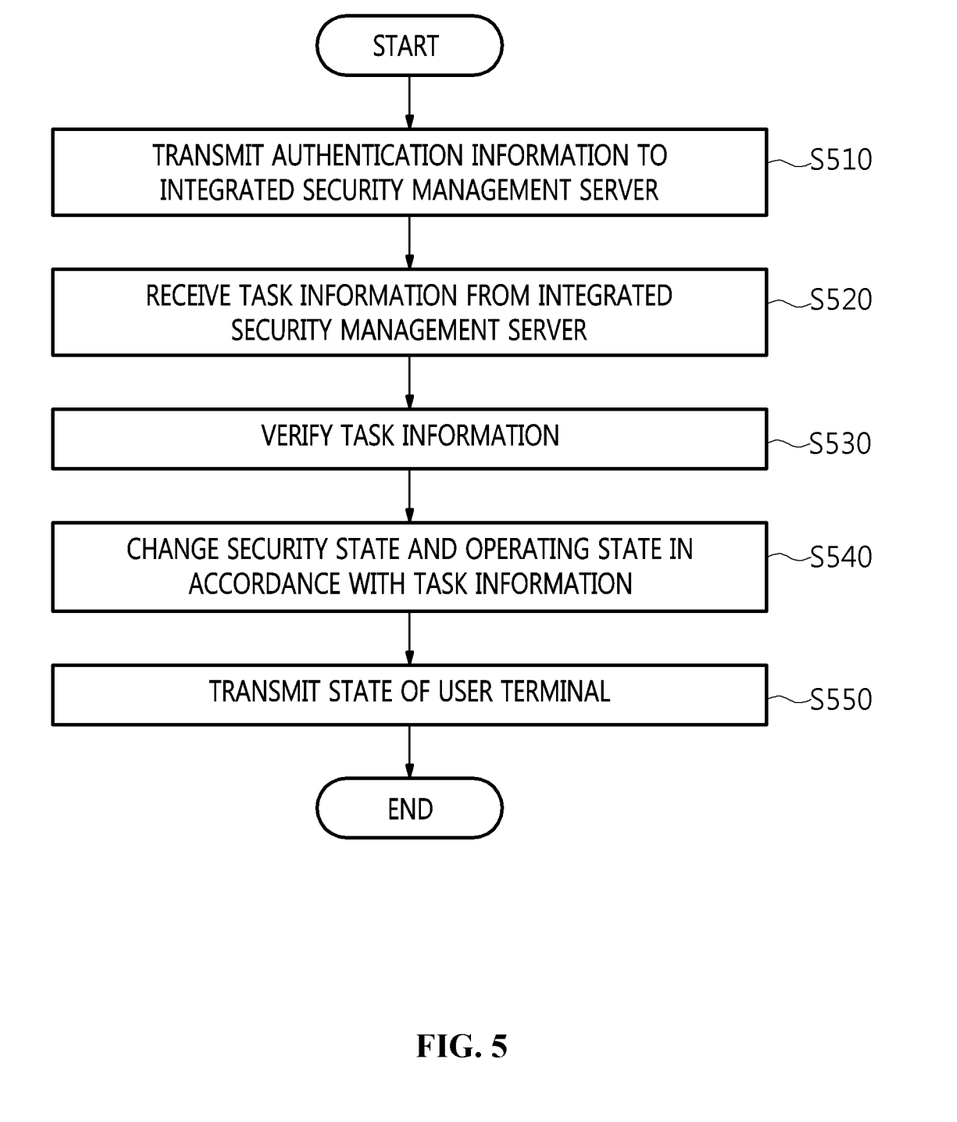
FIG. 5 is a flowchart for explaining a method for operating a user terminal that uses a cloud service according to an embodiment of the present invention.

FIG. 5 is a flowchart for explaining a method for operating a user terminal that uses a cloud service according to an embodiment of the present invention.

First, the user terminal 300 transmits authentication information to the integrated security management server 200 at step S510.

The user terminal 300 may transmit authentication information including at least one of terminal authentication information and user authentication information to the integrated security management server 200. Details of the terminal authentication information and the user authentication information are substantially identical to those of the authentication information received by the integrated security management server 200 at step S410 of FIG. 4, and thus a detailed description thereof will be omitted.

Next, the user terminal 300 receives task information from the integrated security management server 200 at step S520.

The user terminal 300 may receive task information including at least one of resource control setting information, security setting information, configuration information, software configuration change information, software function control information, and resource control information from the integrated security management server 200.

The procedure in which the user terminal 300 receives the task information is substantially identical to the procedure in which the integrated security management server 200 transmits task information at step S420 of FIG. 4, and thus a repeated description thereof will be omitted.

Next, the user terminal 300 verifies the received task information at step S530.

When verification information is included in the task information received at step S520, the user terminal 300 may verify the task information using the verification information. The verification information may be a hash value or signature information for the task information, and the user terminal 300 may verify the task information received at step S520 using the verification information.

When verification of the task information fails, the user terminal 300 may notify the user of failure in the verification of the task information, and may disconnect communication with the integrated security management server 200.

For convenience of description, the user terminal 300 has been described as verifying the task information and then performing an operation corresponding to the task information at step S540, but the present invention is not limited thereto. For example, when verification information is not received at step S520, the user terminal 300 may omit the performance of step S530.

The user terminal 300, having verified the task information, changes the security state and operating state thereof in accordance with the task information at step S540.

The task information received at step S520 may be resource control setting information including at least one of resource access control information and browser control information. When the resource access control information is received, the user terminal 300 may control access to operating system resources for respective users. Also, when the browser control information is received, the user terminal 300 may control access to browser resources for respective cloud services.

The security setting information may include at least one of a user password change period, a screensaver running period, information on authority to permit addition and installation of software for respective users, and information on authority to permit deletion of software for respective users. When the security setting information is received at step S520, the user terminal 300 may perform an operation corresponding to the received security setting information and may then change the security state or the operating state thereof.

Further, the configuration information may include at least one of software storage address information, address information of respective domains, and information on time synchronization with the integrated security management server. When the configuration information is received at step S520, the user terminal 300 may perform an operation corresponding to the received configuration information, and may then change the security state or operating state thereof.

In addition, the user terminal 300 may receive command information including at least one of software configuration change information, software function control information, and resource control information at step S520, and may perform an operation corresponding to the received command information at step S540.

Finally, the user terminal 300 transmits the state information of the user terminal to the integrated security management server 200 at step S550.

After performing processing corresponding to the task information at step S540, the user terminal 300 may transmit at least one of the result of processing the task information and the state information to the integrated security management server 200.

Furthermore, the user terminal 300 may check the security state thereof either periodically or when a security threat is determined to occur, and may transmit the result of checking the security state to the integrated security management server 200.

Hereinafter, an integrated security management system for a user terminal that uses a cloud service according to another embodiment of the present invention will be described in detail with reference to FIG. 6.

Figure 6:
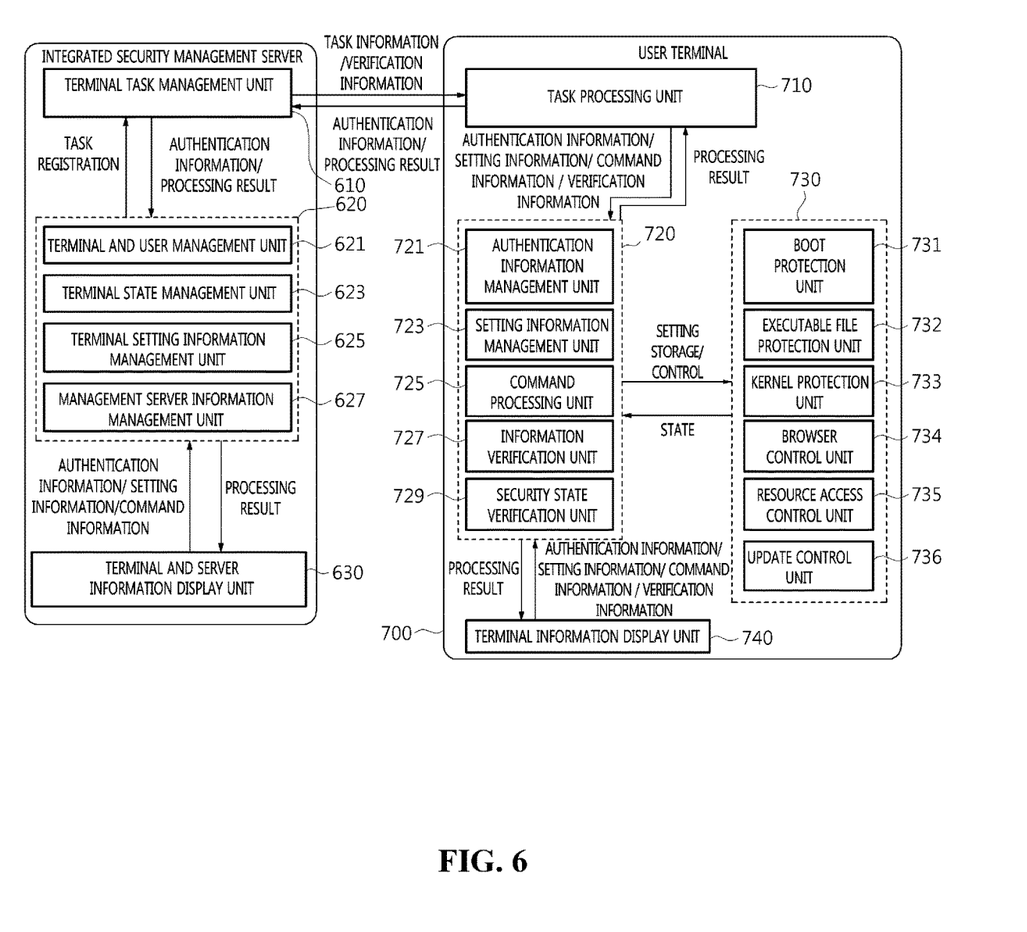
FIG. 6 is a configuration diagram illustrating an integrated security management system for a user terminal that uses a cloud service according to another embodiment of the present invention.

FIG. 6 is a configuration diagram illustrating an integrated security management system for a user terminal that uses a cloud service according to an embodiment of the present invention.

As illustrated in FIG. 6, the integrated security management system for the user terminal that uses a cloud service may include an integrated security management server 600 and one or more user terminals 700.

The integrated security management server 600 may include a terminal task management unit 610, an integrated terminal management unit 620, and a terminal and server information display unit 630. The integrated terminal management unit 620 may include a terminal and user management unit 621, a terminal state management unit 623, a terminal setting information management unit 625, and a management server information management unit 627.

The terminal task management unit 610 of the integrated security management server 600 may receive authentication information from the task processing unit 710 of each user terminal 700, transmit task information and verification information to the task processing unit 710, and receive the result of processing the task information from the task processing unit 710.

The integrated terminal management unit 620 may register tasks in the terminal task management unit 610 and may receive the authentication information of each user terminal 700 and result of processing by the user terminal 700 from the terminal task management unit 610.

The terminal and user management unit 621 of the integrated terminal management unit 620 may process the addition, revision, or deletion of user terminals 700 and users, and may authenticate the user terminals 700 and users based on the authentication information of the user terminals 700.

The terminal state management unit 623 processes the security state and operating state of each user terminal 700 based on the result of processing received from the user terminal 700, and the terminal setting information management unit 625 may process resource control setting information and security setting information, which is related to the security of the user terminal 700, and configuration information related to the operation of the user terminal 700.

The management server information management unit 627 may manage manager information related to the operation of the integrated security management server 600, and additional information for generating verification information. Furthermore, the management server information management unit 627 may authenticate a manager based on information received by the terminal and server information display unit 630 from the corresponding manager.

The manager information may include at least one of a manager ID, a manager password, Internet Protocol (IP) address information, and Media Access Control (MAC) information. Further, the additional information for generating verification information may include at least one of hash algorithm information, signature algorithm information, and signature key information.

Next, the terminal and server information display unit 630 may receive at least one of the authentication information, setting information, and command information of a server manager, may transmit the received information to the integrated terminal management unit 620, and may output and provide the result of processing by the integrated terminal management unit 620 to the server manager.

Individual modules (or units) of the integrated security management server 600 may store and manage the task information, the verification information, the authentication information, the setting information, the results of processing, etc. in at least one of memory, a file and a database (DB).

Each user terminal 700 may include a task processing unit 710, a task management unit 720, a task execution unit 730, and a terminal information display unit 740. Further, the task management unit 720 may include an authentication information management unit 721, a setting information management unit 723, a command processing unit 725, an information verification unit 727, and a security state verification unit 729.

Further, the task execution unit 730 may include a boot protection unit 731, an executable file protection unit 732, a kernel protection unit 733, a browser control unit 734, a resource access control unit 735, and an update control unit 736.

The task processing unit 710 may receive task information and verification information from the terminal task management unit 610 of the integrated security management server 600, and may transfer the received information to the task management unit 720. Further, the task processing unit 710 may verify the effectiveness of task information using the verification information, generate setting information, command information, etc. by analyzing the task information, and deliver the generated setting information and command information to a suitable module in the task management unit 720. Furthermore, the task processing unit 710 may transfer the authentication information received from the task management unit 720 to the terminal task management unit 610 of the integrated security management server 600.

The authentication information management unit 721 of the task management unit 720 may manage terminal authentication information and user authentication information. The setting information management unit 723 may receive and manage the setting information and the verification information from the task processing unit 710, and may transfer the received information to the task execution unit 730.

The command processing unit 725 may control the task execution unit 730 by receiving the command information from the task processing unit 710, the information verification unit 727 may process a verification request received from the task execution unit 730 and store the result of processing, and the security state verification unit 729 may manage the state of the task execution unit 730.

Next, the boot protection unit 731 of the task execution unit 730 may verify the integrity of software running in a boot stage using hardware and software. In this case, the boot protection unit 731 may verify integrity using a hash value or a signature.

When a certain executable file runs, the executable file protection unit 732 may verify the integrity of the corresponding file in a kernel. Here, the term "executable file" may include at least one of an executable binary file and an executable script file, and the executable file protection unit 732 may verify integrity using a hash value or a signature.

Further, the kernel protection unit 733 verifies the integrity of the critical area of the kernel. The kernel protection unit 733 may verify the integrity of the critical area of the kernel including at least one of code, read-only data, a file pointer, an executable file list, and a kernel module list.

The browser control unit 734 may limit authority to access resources by a browser depending on a cloud service server, which is a cloud service access point, is accessed depending on a service server, and the resource access control unit 735 may limit authority to access resources by the user terminal 700 depending on a user. Further, the update control unit 736 may change the configuration of software installed on the user terminal 700.

Also, the operating state of each module of the task management unit 720 may be changed under the control of the setting information management unit 723 and the command processing unit 725.

Finally, the terminal information display unit 740 may receive authentication information, setting information, command information, an information query, etc. from the user, and may transfer the received information to the task management unit 720. Furthermore, the terminal information display unit 740 may receive and output the result of processing by the task management unit 720.

Hereinafter, the control of access to resources by a user terminal according to an embodiment of the present invention will be described in greater detail with reference to FIG. 7.

Figure 7:
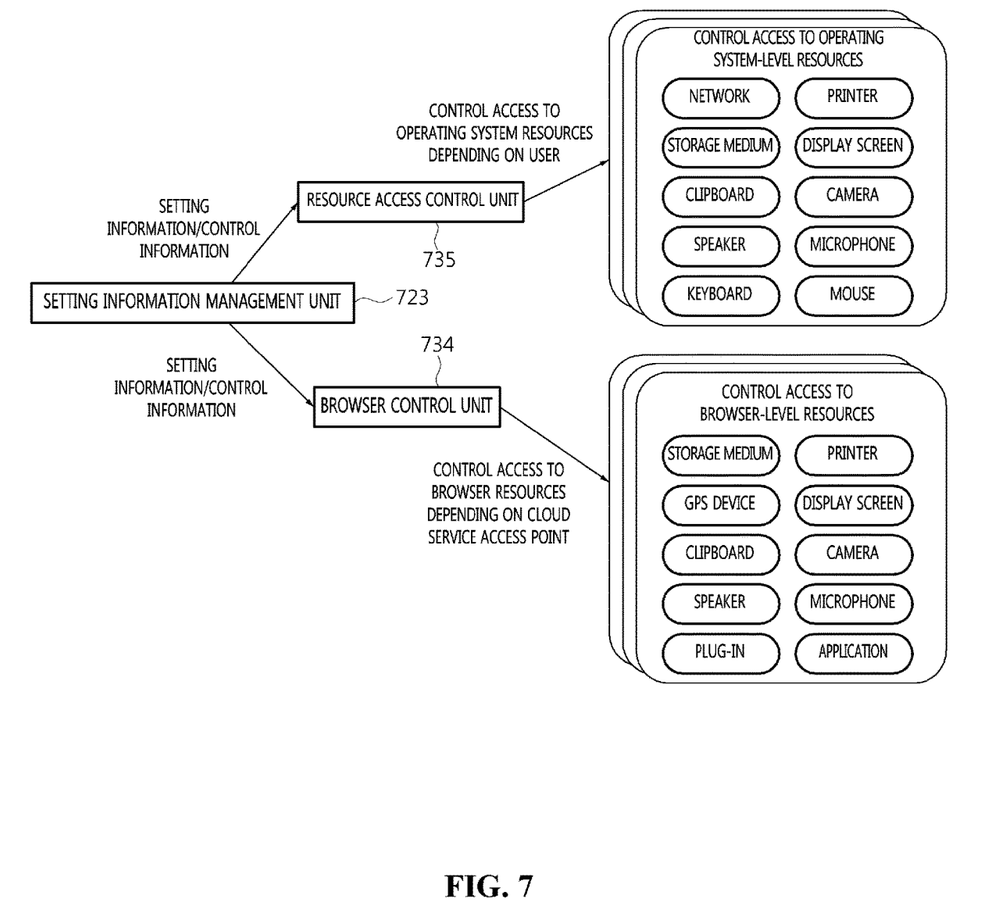
FIG. 7 is a diagram for explaining resource access control by a user terminal according to an embodiment of the present invention.

FIG. 7 is a diagram for explaining the control of access to resources by a user terminal according to an embodiment of the present invention.

As illustrated in FIG. 7, the setting information management unit 723 transfers both setting information and control information to the resource access control unit 735 and the browser control unit 734. Further, the resource access control unit 735 may control access to operating system-level resources and the browser control unit 734 may control access to browser-level resources.

Examples of operating system-level resources may include at least one of a network, a printer, a storage medium, a display screen, a clipboard, a camera, a speaker, a microphone, a keyboard, and a mouse. The operating system-level resources may have at least one of a wired form and a wireless form, and may take an internal (embedded) form or an external form.

Further, examples of the browser-level resources may include at least one of a storage medium, a printer, a Global Positioning System (GPS) device, a display screen, a clipboard, a camera, a speaker, a microphone, a plug-in, and an application. Also, the browser-level resources may have at least one of a wired form and a wireless form, and may take at least one of an internal form and an external form.

Figure 8:
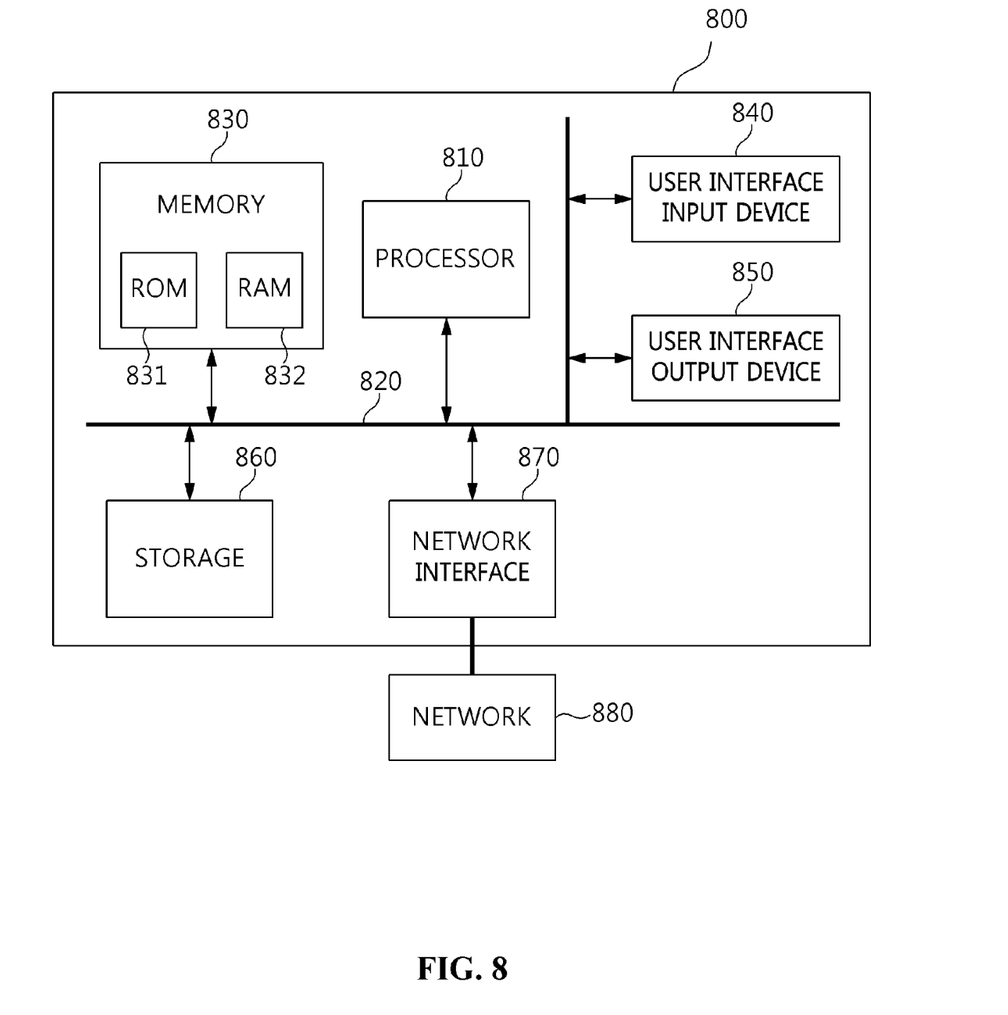
FIG. 8 is a block diagram illustrating a computer system according to an embodiment of the present invention.

FIG. 8 is a block diagram illustrating a computer system according to an embodiment of the present invention.

Referring to FIG. 8, the embodiment of the present invention may be implemented in a computer system 800 such as a computer-readable storage medium. As shown in FIG. 8, the computer system 800 may include one or more processors 810, memory 830, a user interface input device 840, a user interface output device 850, and storage 860, which communicate with each other through a bus 820. The computer system 800 may further include a network interface 870 connected to a network 880. Each processor 810 may be a Central Processing Unit (CPU) or a semiconductor device for executing processing instructions stored in the memory 830 or the storage 860. Each of the memory 830 and the storage 860 may be any of various types of volatile or nonvolatile storage media. For example, the memory 830 may include Read-Only Memory (ROM) 831 or Random Access Memory (RAM) 832.

Therefore, the embodiment of the present invention may be implemented as a non-transitory computer-readable medium in which a computer-implemented method is recorded or in which computer-executable instructions are recorded. When the computer-executable instructions are executed by the processor, the instructions may perform the method according to at least one aspect of the present invention.

In accordance with the present invention, operation information and security state information of a user terminal that uses a cloud service may be managed in an integrated manner by overcoming the limitations of interaction with security technology in a conventional terminal management system.

Further, in accordance with the present invention, security setting and operation setting of a user terminal that uses a cloud service may be controlled and the user terminal may be securely managed, through a central integrated security management server.

Furthermore, in accordance with the present invention, the operating system-level resources and browser level-resources of a user terminal may be controlled using an integrated security management server.

As described above, in the user terminal using a cloud service, the integrated security management server for the terminal, and the integrated security management method for the terminal according to the present invention, the configurations and schemes in the above-described embodiments are not limitedly applied, and some or all of the above embodiments can be selectively combined and configured such that various modifications are possible.

What is claimed is:

1. An integrated security management method for a user terminal, comprising:
   receiving, by an integrated security management server, authentication information from at least one user terminal that use a cloud service;
   authenticating, by the integrated security management server, the user terminal using the received authentication information;
   transmitting, by the integrated security management server, task information to the user terminal so as to control the user terminal;
   receiving, by the integrated security management server, at least one of a result of processing the task information and state information from the user terminal that verifies the task information; and
   managing, by the integrated security management server, a state of the user terminal based on at least one of the result of processing and the state information.

2. The integrated security management method of claim 1, wherein transmitting the task information to the user terminal comprises transmitting the task information and verification information related to the task information to the user terminal, and allowing the user terminal to verify the task information using the verification information.

3. The integrated security management method of claim 2, wherein:
the task information comprises at least one of resource control setting information, security setting information, configuration information, software configuration change information, software function control information, and resource control information, and
the verification information comprises at least one of a hash value and signature information for the task information.

4. The integrated security management method of claim 3, wherein the security setting information comprises at least one of a user password change period, a screensaver running period, information on authority to permit addition and installation of software for respective users, and information on authority to permit deletion of software for respective users, and
the configuration information comprises at least one of software storage address information, address information of respective domains, and information on time synchronization with the integrated security management server.

5. The integrated security management method of claim 3, wherein the resource control setting information controls the user terminal such that the user terminal performs at least one of control of access to operating system resources and control of access to browser resources.

6. The integrated security management method of claim 5, wherein the resource control setting information comprises at least one of resource access control information that allows the user terminal to control access to the operating system resources for respective users and browser control information that allows the user terminal to control access to the browser resources for respective cloud services.

7. The integrated security management method of claim 6, wherein the resource access control information controls access to the operating system resources comprising at least one of a network, a storage medium, a clipboard, a camera and an input/output device that correspond to the user terminal.

8. The integrated security management method of claim 6, wherein the browser control information controls access to the browser resources comprising at least one of a storage medium, a Global Positioning System (GPS) device, a clipboard, a camera, a plug-in, and an application that correspond to the user terminal.

9. The integrated security management method of claim 1, wherein receiving the authentication information comprises receiving the authentication information comprising at least one of terminal authentication information and user authentication information for the user of the user terminal.

10. An integrated security management server for a user terminal, comprising:
a communication unit for receiving authentication information from at least one user terminal that use a cloud service;
a terminal and user authentication unit for authenticating the user terminal using the authentication information;
a task information management unit for managing task information to be transmitted to the user terminal so as to control the user terminal; and
a terminal state management unit for managing at least one of a result of processing the task information and state information received from the user terminal that processes the task information.

11. The integrated security management server of claim 10, wherein the communication unit transmits the task information and verification information comprising at least one of a hash value and signature information for the task information to the user terminal, and receives at least one of the result of processing the task information and the state information from the user terminal that verifies the task information.

12. The integrated security management server of claim 11, wherein the task information management unit manages the task information comprising at least one of resource control setting information, security setting information, configuration information, software configuration change information, software function control information, and resource control information.

13. The integrated security management server of claim 12, wherein the resource control setting information comprises at least one of resource access control information that allows the user terminal to control access to operating system resources for respective users and browser control information that allows the user terminal to control access to browser resources for respective cloud services.

14. The integrated security management server of claim 10, wherein the terminal and user authentication unit is configured to, before transmitting the task information to the user terminal, authenticate the user terminal based on terminal authentication information received from the user terminal, and authenticate a user of the cloud service based on user authentication information.

15. A user terminal for providing a cloud service to a user, comprising:
a terminal communication unit for transmitting authentication information to an integrated security management server, and receiving task information from the integrated security management server that performs authentication based on the authentication information;
a task information verification unit for verifying the task information based on verification information received from the integrated security management server;
a state management unit for managing at least one of a security state and an operating state of a user terminal;
an integrity verification unit for verifying integrity of at least one of software, a file, and a kernel area in accordance with the task information that has been verified;
a resource access control unit for controlling authority to access resources in accordance with the task information that has been verified; and
an update control unit for changing configuration of previously installed software in accordance with the task information that has been verified.

16. The user terminal of claim 15, wherein the terminal communication unit receives the task information that comprises at least one of resource control setting information, security setting information, configuration information, software configuration change information, software function control information, and resource control information, and the verification information that comprises at least one of a hash value and signature information for the task information.

17. The user terminal of claim 16, wherein the security setting information comprises at least one of a user password change period, a screensaver running period, information on authority to permit addition and installation of software for respective users, and information on authority to permit deletion of software for respective users.

18. The user terminal of claim 15, wherein the resource access control unit comprises:
- a resource access control module for controlling access to operating system resources for respective users based on the task information; and
- a browser control module for controlling access to browser resources for respective cloud services based on the task information.

19. The user terminal of claim 15, wherein the state management unit periodically checks a security state of the user terminal and checks the security state when a security threat is determined to occur.

20. The user terminal of claim 16, wherein the configuration information comprises at least one of software storage address information, address information of respective domains, and information on time synchronization with the integrated security management server.

* * * * *